United States Patent
Nørskov et al.

(10) Patent No.: US 6,663,998 B2
(45) Date of Patent: Dec. 16, 2003

(54) ANODE CATALYST MATERIALS FOR USE IN FUEL CELLS

(75) Inventors: Jens Kehlet Nørskov, Lyngby (DK); Ping Liu, Lyngby (DK)

(73) Assignee: The Technical University of Denmark (DTU), Lyngby (DK)

( * ) Notice: Subject to any disclaimer, the term of this patent is extended or adjusted under 35 U.S.C. 154(b) by 208 days.

(21) Appl. No.: 09/825,841

(22) Filed: Apr. 5, 2001

(65) Prior Publication Data

US 2002/0146614 A1 Oct. 10, 2002

(51) Int. Cl.[7] .................. H01M 4/86; H01M 4/90; H01M 4/96
(52) U.S. Cl. ............................................. 429/40
(58) Field of Search ............................................. 429/40

(56) References Cited

U.S. PATENT DOCUMENTS

| | | |
|---|---|---|
| 3,428,544 A | 2/1969 | Bianchi et al. |
| 5,013,618 A | 5/1991 | Luczak |
| 5,028,498 A | 7/1991 | Lindström |
| 5,208,207 A | 5/1993 | Stonehart et al. |
| 5,500,307 A | 3/1996 | Anzai et al. |
| 5,879,827 A * | 3/1999 | Debe et al. .................. 429/40 |
| 5,922,487 A | 7/1999 | Watanabe et al. |
| 6,007,934 A | 12/1999 | Auer et al. |
| 6,066,410 A | 5/2000 | Auer et al. |
| 6,146,781 A * | 11/2000 | Surampudi et al. ............ 429/35 |
| 6,284,402 B1 * | 9/2001 | Mallouk et al. ............... 429/40 |
| 6,299,778 B1 * | 10/2001 | Penth et al. .................. 210/650 |
| 6,319,293 B1 * | 11/2001 | Debe et al. .................. 29/623.3 |
| 6,326,098 B1 * | 12/2001 | Itoh et al. .................... 429/40 |

FOREIGN PATENT DOCUMENTS

| | | |
|---|---|---|
| EP | 0 292 184 | 11/1988 |
| EP | 0 764 466 | 3/1997 |
| EP | 0 880 188 | 11/1998 |
| EP | 0 945 910 | 9/1999 |
| EP | 0 952 241 | 10/1999 |
| EP | 1 022 795 | 7/2000 |
| JP | 07/201344 | 8/1995 |
| JP | 09-035736 | 2/1997 |
| JP | 11-312526 | 11/1999 |
| JP | 2000-106193 | 4/2000 |
| WO | WO 98/40161 | 9/1998 |
| WO | WO 00/35037 | 6/2000 |
| WO | WO 00/36679 | 6/2000 |
| WO | WO 00/54346 | 9/2000 |
| WO | WO 00/55928 | 9/2000 |
| WO | WO 00/69009 | 11/2000 |

* cited by examiner

*Primary Examiner*—Randy Gulakowski
*Assistant Examiner*—Donald V. Scaltrito
(74) *Attorney, Agent, or Firm*—Oblon, Spivak, McClelland, Maier & Neustadt, P.C.

(57) ABSTRACT

Catalyst materials having a surface comprising a composition $M_x/Pt_y/Sub$; wherein M is selected from the group of elements Fe, Co, Rh and Ir; or wherein M represents two different elements selected from the group comprising Fe, Co, Rh, Ir, Ni, Pd, Cu, Ag, Au and Sn; and wherein Sub represents a substrate material selected from Ru and Os; the respective components being present within specific ranges, display improved properties for use in anodes for low-temperature fuel cell anodes for PEMFC fuel cells and direct methanol fuel cells.

19 Claims, 4 Drawing Sheets

ANODE CATALYST MATERIALS FOR USE IN FUEL CELLS

BACKGROUND OF THE INVENTION

1. Field of the Invention

The present invention relates to improved anode catalyst materials for use in fuel cells. More specifically, the present invention relates to CO tolerant anode catalyst materials for use in the low temperature proton exchange membrane fuel cell (PEMFC) or the direct methanol fuel cell (DMFC).

2. Background Art

Fuel cells based on polymer electrolytes present a promising approach to a stable, low-temperature energy source for e.g. vehicles. A substantial amount of interest has been focused on the $H_2$ fuel cells as well as the direct methanol fuel cells.

One of the promising developments in $H_2$ fuel cells is the proton exchange membrane fuel cell (PEMFC) which is based on a polymer proton conducting membrane acting as the electrolyte, and which operates at low temperatures, typically 80° C.

The principle of such a $H_2$ fuel cell can be outlined as follows: The fuel cell comprises an anode and a cathode, which are physically separated by a membrane of a polymer electrolyte. Hydrogen is supplied to the anode and atmospheric oxygen is accessible to the cathode. If electrically conducting cords are connected to the anode and cathode, respectively, and a circuit thereby is established (e.g. by connecting an external power consuming unit) the fuel cell will begin operating.

At the anode, the supplied hydrogen is dissociated to protons and electrons according to the reaction:

$$H_2 \rightarrow 2H^+ + 2e^-$$

The electrically insulating polymeric electrolyte membrane prevents the flow of electrons from the anode through the membrane to the cathode, whereas the produced protons readily flow through the membrane from the anode to the cathode.

At the cathode, supplied oxygen will be reduced according to the following reaction:

$$O_2 + 4H^+ + 4e^- \rightarrow 2H_2O$$

Thus, the net result in operating the fuel cell will be the conversion of hydrogen (supplied at the anode) and oxygen (supplied at the cathode) to water and electrical energy.

The $H_2$ supplied to this kind of fuel cell is usually produced from natural gas or from methanol or other liquid fuels by a reformer system. Hydrogen obtained this way inevitably contains small amounts of CO impurities.

The purpose and the requirement of the anode catalyst material—to dissociate hydrogen to protons and electrons—obviously make the type of anode material a crucial feature. At present, the most successful materials have proven to be platinum or platinum-based alloys. These materials work perfectly for pure hydrogen. However, these prior art materials for use as anode catalysts in low-temperature proton exchange membrane fuel cells suffer from a severe drawback. Carbon monoxide shows a high affinty towards these materials compared to the affinity of hydrogen. As a result, when using the hydrogen originating from reformer systems, the specific, active sites on the surface of the prior art platinum or platinum-based alloy catalyst materials will be occupied by carbon monoxide molecules and will accordingly over time reduce the accessibility of hydrogen molecules to these sites. Thus, as a result, the fuel cell will have a smaller efficiency. This situation is also termed "poisoning" of the catalyst.

The direct methanol fuel cell (DMFC) is currently also subject to considerable interest and research. In this system methanol is supplied to the anode and atmospheric oxygen is available to the cathode. The processes taking place in a DMFC are rather complicated; however, carbon monoxide is formed at the anode in an intermediate reaction step. Thus, also in this kind of fuel cells the problems associated with the poisoning of the anode are present.

The present invention is applicable to the $H_2$ fuel cell systems as well as the direct methanol fuel cell systems.

Numerous examples of materials based on platinum for use as catalysts are known in the art:

WO 00/55928 (Gorer; Symyx Technologies, Inc.; published on Sep. 21, 2000) relates inter alia to an improved noble ternary metal alloy composition for a fuel cell catalyst, which alloy contains Group VIII metals especially Pt, Ru and Ni. The PtRuNi alloys have a bulk composition in the range of about 40 to about 70 atomic % of Pt, about 30 to about 50 atomic % of Ru and less than about 30 atomic % of Ni. The fuel used consists of hydrogen or preferably of methanol. The alloys may be used in PEMFC. The CO tolerance is rather satisfactory, but the alloys suffer from the drawback that the Ni content will be corroded as a result of the acidic ambience of the anode.

WO 00/54346 (Gorer; Symyx Technologies, Inc.; published on Sep. 14, 2000) relates inter alia to an improved ternary nobel metal alloy catalyst composition for use in electrochemical reactor devices, which alloy consists essentially of from about 20 to about 60 atomic % Pt, from about 20 to about 60 atomic % Ru, and from about 5 to about 45 atomic % Pd, the atomic ratio of Pt to Ru being between about 0.6 and about 1.8. The useful fuel is preferably selected from saturated hydrocarbons, garbage off-gas, oxygenated hydrocarbons, fossil fuels, mixtures thereof and is most preferably methanol. The alloys may be used in a PEMFC. The CO tolerance is considerably less satisfactory than for the former prior art catalyst material.

U.S. Pat. No. 5,922,487 (Watanabe et al.; Tanaka Kikinzoku Kogyo, Masahiro Watanabe and Stonehart Associates, Inc.; published Jul. 13, 1999) discloses an anode electrocatalyst for a fuel cell comprising an alloy essentially consisting of at least 1 to 60 atomic % Sn or 33 to 55 atomic % Mo or 30 to 60 atomic % Ge and the balance of one or more noble metals selected from Pt, Pd and Ru. Sn, Ge and Mo has the ability of depressing the poisoning of the noble metal with CO. The use of these electrocatalysts in solid polymer electrolyte fuel cells is contemplated. The CO tolerance is just as satisfactory as for the first-mentioned prior art catalytic material, but also here corrosion problems prevail under the acidic ambience of the anode.

U.S. Pat. No. 5,208,207 (Stonehart et al.; Tanaka Kikinzoku Kogyo K. K., Stonehart Associates Inc.; published on May 4, 1993) relates to a catalyst, which comprises an inorganic support and a ternary alloy essentially consisting of 10–50 atomic-% Pt, 10–50 atomic % Pd and 10–50 atomic-% Ru. In the specification it is stated that the support is restricted to inorganic porous substances. Especially preferred support materials are silica, alumina or carbon. Although it is stated that the catalyst possesses excellent anti-CO-poisoning properties, these properties are considerably less satisfactory than the properties of the first-mentioned prior art catalytic material.

U.S. Pat. No. 5,013,618 (Francis J. Luczak; International Fuel Cells Corporation; published May 7, 1991) refers to a noble metal ternary alloy catalyst for use in fuel cell electrodes and other catalytic structures. The catalyst exhibits increased mass activity and stability. The catalyst comprises a ternary alloy of Pt, Ir, and a metal selected from the group consisting of Fe, Cr, Co, Ni, V, Ti and Mn. However, only phosphoric acid fuel cells are mentioned in this publication. The use of this catalyst takes place at a temperature being much higher than the low-temperature fuel cell operating temperature.

SUMMARY OF THE INVENTION

An object of the present invention is to provide anode catalyst materials with improved CO tolerance and/or corrosion resistance for use in fuel cells. More specifically, this object is to provide ternary and quaternary anode catalyst materials for use in low-temperature proton exchange membrane fuel cells (PEMFC) or in direct methanol fuel cells (DMFC) or for other fuel cell systems, where CO poisoning is a problem. Another object of the present invention is to provide anodes for fuel cells comprising said inventive catalyst materials. A third object of the present invention is to provide fuel cells comprising such anodes. Yet another object of the present invention is a method for the manufacture of the inventive catalyst materials and, finally, a further object of the present invention is a method for the generation of electrical power by using a fuel cell according to the invention.

It is a well-known feature of ruthenium, that attempts to alloy this metal with other metal(s) lead to the segregation of the other metal(s) to the surface. Accordingly, this makes ruthenium-based alloys a perfect substrate material (in the following we refer to the Ru-based alloy as the Ru substrate) for catalyst materials as only the surface of such a material is active in the catalytic process. As mentioned above, Pt is an ideal metal for use as catalysts for PEMFC when ultra pure hydrogen is used as a fuel, but the platinum atoms get occupied by carbon monoxide even if only trace amounts of CO are present in the hydrogen feed.

Thus, the basic idea of the present invention is to modify the surface properties of platinum and thereby adjusting the absorption energies of hydrogen and carbon monoxide, respectively, in such a way that the rate of proton formation is increased and the occupation of carbon monoxide is depressed; leading to catalyst materials that are far better than the catalysts of prior art. Thus, according to the invention this modification of the surface properties is accomplished by utilising contributions from the underlying substrate metal as well as contributions from modifying surface metal atoms other than platinum. As an alternative, substrate metal Os is taken into consideration.

It has surprisingly been found that a fuel cell anode catalyst material having a surface being comprised of:

a composition $M_x/Pt_y/Sub$;

wherein

M is selected from the group of elements Fe, Co, Rh and Ir; or

M represents $M^1_m + M^2_n$;

$M^1$ and $M^2$ being different from each other, are selected from the group of elements consisting of Fe, Co, Rh, Ir, Ni, Pd, Cu, Ag, Au and Sn;

Sub represents the substrate metal being selected from Ru and Os, which substrate metal may be present at the surface of the anode material in an amount of less than 25% and will be alloyed in the bulk with the metal M and Pt;

x is a number in the range of 0.7–1.3;

y is a number in the range of 0.7–2.3; and m and n are each a number in the range of 0.7–2.3, lead to catalysts showing improved CO tolerance when used as catalyst material for anodes in the low temperature proton exchange membrane fuel cell (PEMFC), especially when using reformate hydrogen as fuel or when used as catalyst materials for anodes in the direct methanol fuel cell (DMFC).

In the present application x, y, m and n signify the relative occurrence of the respective elements in the surface, not including the substrate metal. Preferably, x is a number in the range of 0.8–1.2, and especially x is 1. Preferably, y is a number in the range of 0.8–2.2, and especially y is 2. Preferably, m and n are each a number in the range of 0.8–2.2, and especially m and n are 2.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWING

The accompanying drawings, which are incorporated into and form part of the specification, illustrate the embodiments of the present invention and prior art catalysts, respectively, and together with the description, serve to explain the principles of the invention. In the drawings.

DETAILED DESCRIPTION OF THE INVENTION

Figure 1:
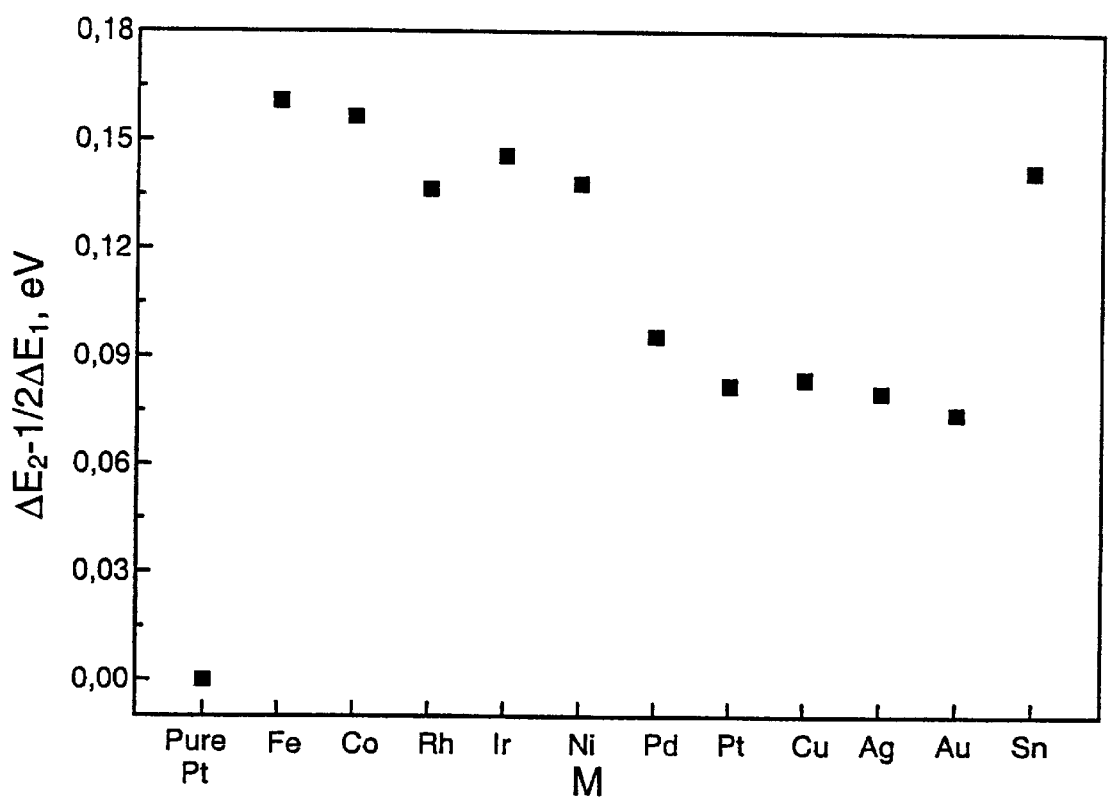
FIG. 1 depicts the surface reactivity of various ternary alloys, some of which are prior art alloys.

The active part of a catalyst is the surface, and the specification of the active site therefore requires knowledge of the surface composition and structure. This is usually different from the bulk composition and structure due to surface segregation. In case of Pt-Ru alloys, for instance, Pt segregates strongly to the surface, and it may be shown that in an $H_2$ gas with ppm amounts of CO, there will only be hydrogen adsorption on Pt. Ru is not present at the surface, except when bound to CO (or OH), and all the Ru being at the surface, will therefore be covered and inactive for hydrogen dissociation. It turns out that most metals segregate strongly out of Ru. This makes Ru an ideal component (or substrate) for surface alloy anode catalysts. The Ru below the surface is, however, important because it modifies the properties of the Pt in the first surface layer. Ru in the surface may further be important in connection with CO-oxidation.

According to the invention the same effect is exploited in connection with ternay and quaternary alloy catalysts. Using Ru alloys, the other components being added will segregate to the surface, while two or three metals will form a layer at the top of the surface of the Ru-based alloy. Because Pt is a perfect anode catalyst in the absence of CO, Pt is selected as one of the elements of the surface alloys. Using a different active metal will typically either make the CO bond too strongly or the hydrogen too weakly.

The first group of structures contemplated are ternary alloys of the type modifying metal/Pt/Ru. Since the modifying metal and Pt segregate to the surface, these alloys represent surface alloys of Pt and the modifying metal on top of the Ru-based alloy surface. The modifying metals investigated are Fe, Co, Rh, Ir, Ni, Pd, Pt, Cu, Ag, Au, and Sn. The most efficient ratio of Pt to the modifying metal at the surface of the structures is also investigated. It is found that a ratio of approximately 2 Pt atoms to approximately 1 modifying metal atom in the first surface layer results in the best performance of the alloys. A ratio between 1 and 3 gives better results than binary alloys. Among the modifying metals used in the ternary alloys of the type modifying metal/Pt/Ru, modifying metals selected from Fe and Co seems to give significantly better CO tolerances than the best prior art ternary alloys consisting of Pt, Ru and Ni or Sn, whereas the modifying metals Rh and Ir give the same or better CO tolerance than said prior art ternary alloys in combination with improved corrosion stability.

In addition to the ternary alloys, quaternary alloys are further contemplated. These alloys consist in addition to Ru as the support metal of a surface layer comprising Pt and in addition two different metals selected from the group of metals mentioned above. It is surprisingly found that a quaternary alloy consisting of Co, Fe, Pt and Ru provides the most efficient CO tolerance among the alloys considered.

Also other quaternary alloys, e.g. an alloy of Ni, Fe, Pt and Ru, seem to provide a higher CO tolerance than the most efficient ternary alloys.

Furthermore, other support metals than Ru is contemplated. Among these other support metals, especially Os is found to perform very well.

Fuel cell anodes may be manufactured in various ways well-known in the art, e.g. by powder coating, sputtering, plasma deposition and chemical coating.

EXAMPLE 1

A way of manufacturing model systems for measuring the surface reactivity of the catalyst surfaces (i.e. the difference between the adsorption energies of CO and $H_2$) is to provide a substrate layer of Ru and to the surface of this layer evaporating Pt and other metals from a 0.3 mm wire heated resistively, with the sample kept at room temperature. The structure of the surface alloy can be determined using scanning tunneling microscopy. The sample can then be exposed to CO and $H_2$, respectively, and Temperature Programmed Desorption (TPD) measurements can then be carried out to measure the strength of the CO and the $H_2$ surface bond. The weaker the bond, the lower the desorption temperature. Reference is made to M. Ø. Pedersen, I. Stensgaard, E. Laegsgaard, B. Hammer, J. K. Nørskov, and F. Besenbacher, Surf.Sci, 426, 395 (1999), which is incorporated herein by reference. During such experiments, the sample temperature is ramped at 2 K/s, the temperature being measured with a thermocouple junction pressed against the back of the crystal.

EXAMPLE 2

FIG. 1 depicts the surface reactivity of various ternary alloys, M/Pt/Ru with a ratio of Pt:M=2:1 in the surface layer. The alloyed atom in the surface, M, is listed along the horizontal axis. "Pure Pt" represents monometallic Pt, while "Pt" represents the binary alloy Pt/Ru. The reactivity is measured by the difference of the adsorption energies of CO($\Delta E_2$) and $H_2$($\Delta E_1$), $\Delta E_2 - \frac{1}{2}\Delta E_1$. The larger this number is, the higher the hydrogen coverage (and the lower the CO coverage) and the better the anode catalysts.

As will appear from FIG. 1, the pure Pt has the lowest performance. The most active among the related prior art ternary alloys, viz. Ni/$Pt_2$/Ru and Sn/$Pt_2$/Ru show a surface reactivity corresponding to the alloy according to the invention Rh/$Pt_2$/Ru, but are without the resistance to corrosion shown by the latter alloy.

The alloys Fe/$Pt_2$/Ru, Co/$Pt_2$/Ru and Ir/$Pt_2$/Ru according to the invention show a higher surface reactivity than the afore-mentioned most active prior art alloys.

EXAMPLE 3

Figure 2:
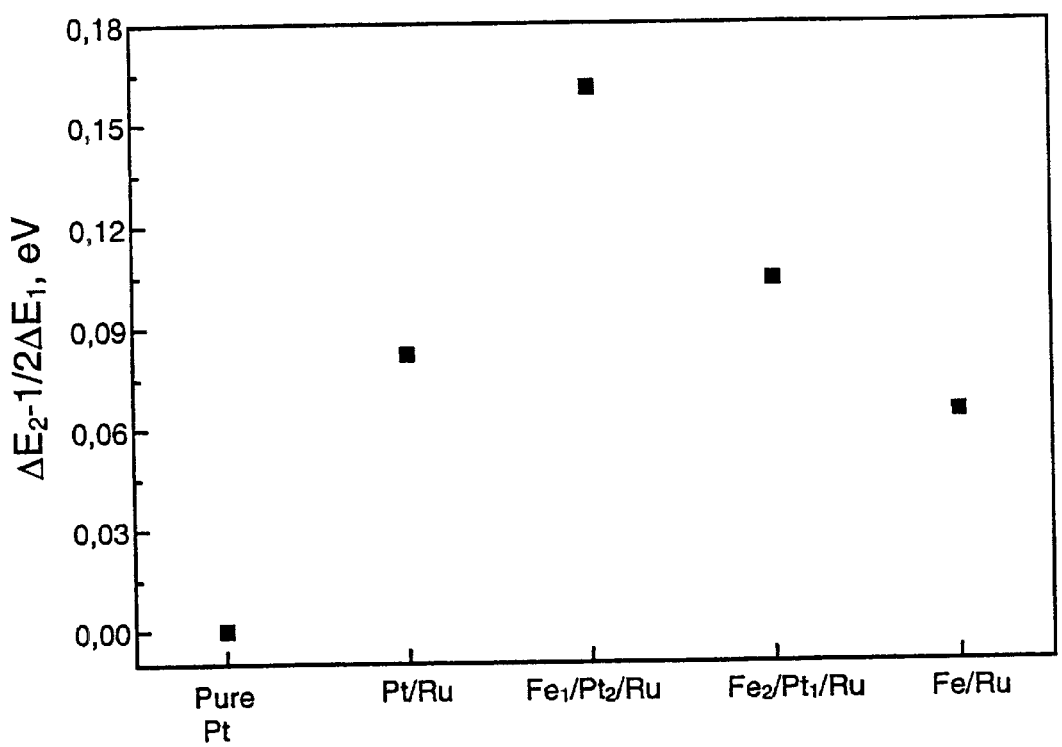
FIG. 2 depicts the surface reactivity of $Pt_y/Fe_x/Ru$ and as a comparison pure Pt and binary alloys of Ru with Pt and Fe, respectively.

FIG. 2 depicts the surface reactivity of $Pt_y$/$Fe_x$. "Pure Pt" represents monometallic Pt. The reactivity is measured by the difference of the adsorption energies of CO($\Delta E_2$) and $H_2$($\Delta E_1$), $\Delta E_2 - \frac{1}{2}\Delta E_1$.

The most active ratio $Pt_y$:$Fe_x$ seems to be approximately 2:1.

EXAMPLE 4

Figure 3:
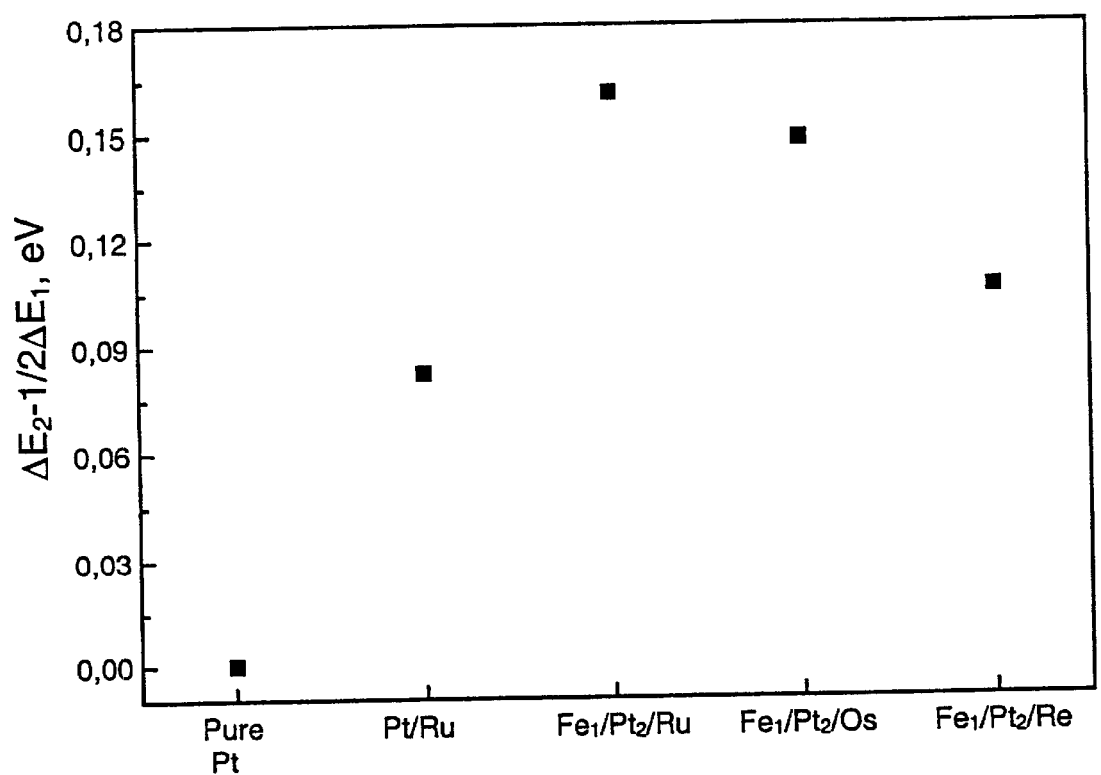
FIG. 3 depicts the surface reactivity of $Pt_2/Fe_1/Sub$, in which "Sub" represents different substrate metals and as a comparison pure Pt and the binary alloy of Pt/Ru.

FIG. 3 depicts the surface reactivity of $Pt_2$/$Fe_1$/Sub. "Pure Pt" represents monometallic Pt. "Sub" represents the substrate, which is Ru, Os and Re, respectively. The reactivity is measured by the difference of the adsorption energies of CO ($\Delta E_2$) and $H_2$($\Delta E_1$), $\Delta E_2 - \frac{1}{2}\Delta E_1$.

Among the alloys, those having Ru as the substrate material seem to provide the best surface reactivity. Also the use of Os as the substrate material seems to provide a very high surface reactivity, whereas Re seems to be less suitable as substrate material but still better than binary Pt/Ru.

EXAMPLE 5

Figure 4:
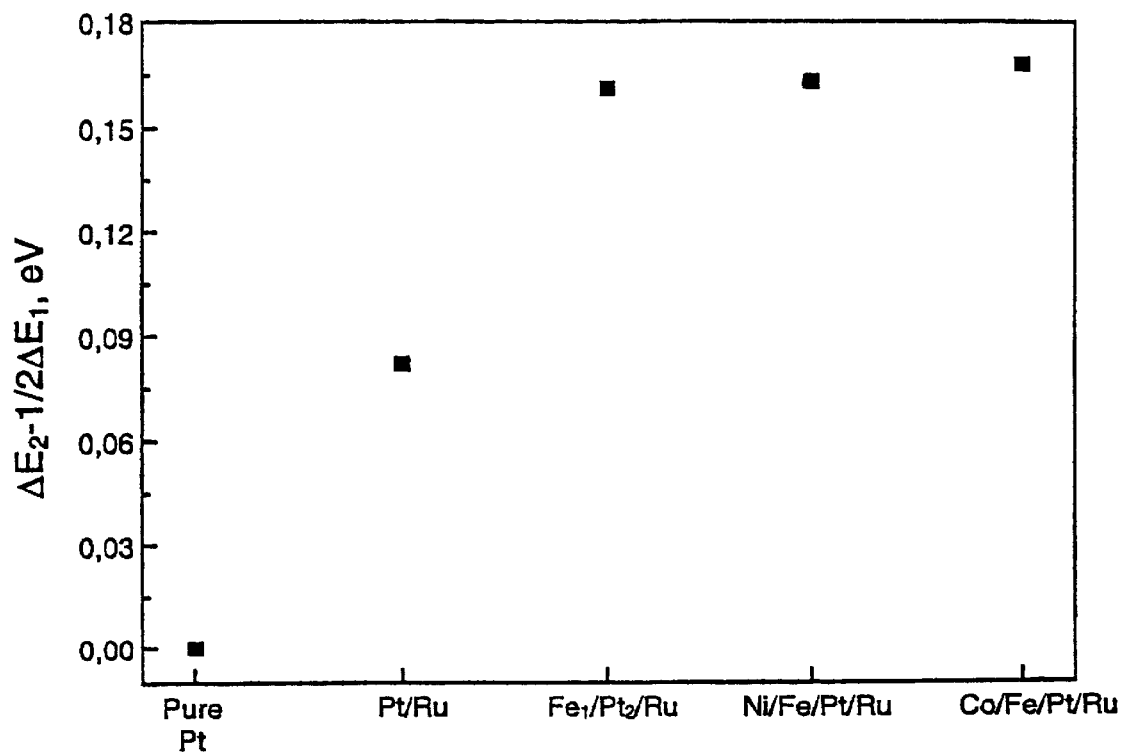
FIG. 4 depicts the surface reactivity of some quaternary alloys and as a comparison pure Pt, the binary alloy Pt/Ru and the ternary alloy $Fe_1/Pt_2/Ru_1$.

FIG. 4 depicts the surface reactivity of quaternary alloys. "Pure Pt" represents monometallic Pt. The reactivity is measured by the difference of the adsorption energies of CO ($\Delta E_2$) and $H_2$($\Delta E_1$), $\Delta E_2 - \frac{1}{2}\Delta E_1$.

The tertiary alloys Co/Fe/Pt/Ru and Ni/Fe/Pt/Ru according to the invention seem to provide an even higher surface reactivity than the most active ternary alloy according to the invention Fe/$Pt_2$/Ru.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A CO tolerant low temperature fuel cell anode catalyst material having a surface, comprising:

a composition $M_x$/$Pt_y$/Sub;

wherein M is selected from the group consisting of elements Fe, Co, Rh and Ir; or M represents $M^1_m + M^2_n$;

$M^1$ and $M^2$ are different from each other, and are selected from the group of elements consisting of Fe, Co, Rh, Ir, Ni, Pd, Cu, Ag, Au and Sn;

Sub represents a substrate metal selected from the group consisting of Ru and Os; wherein said substrate metal may be present at the surface of an anode material in an amount of less than 25%; and wherein said substrate metal is alloyed in the bulk with the metal M and Pt;

x is a number in the range of 0.7 to 1.3;

y is a number in the range of 0.7 to 2.3;

m and n are each a number in the range of 0.7 to 2.3; and x, y, m and n signify the relative occurrence of the different elements at the surface, not including the substrate metal.

2. The material of claim 1, wherein M is selected from the group consisting of Fe, Co, Rh and Ir.

3. The material of claim 2, wherein M is Fe.

4. The material of claim 2, wherein M is Co.

5. The material of claim 2, wherein M is Rh.

6. The material of claim 2, wherein M is Ir.

7. The material of claim 1, wherein $M^1$ and $M^2$ represent Co and Fe, respectively.

8. The material of claim 1, wherein $M^1$ and $M^2$ represent Ni and Fe, respectively.

9. The material of claim 3, wherein the composition is $Fe/Pt_2/Ru$.

10. The material of claim 7, wherein the composition is Co/Fe/Pt/Ru.

11. The material of claim 8, wherein the composition is Ni/Fe/Pt/Ru.

12. An anode for a fuel cell, comprising:

the catalyst material according to claim 1.

13. A fuel cell comprising:

the anode according to claim 12.

14. A method for the manufacture of a catalyst material, comprising:

powder coating, sputtering, plasma depositing or chemical coating the catalyst material according to claim 1; wherein in said catalyst material $M^1$ and $M^2$ represent Co and Fe respectively.

15. A method for the manufacture of a catalyst material, comprising:

powder coating, sputtering, plasma depositing or chemical coating the catalyst material according to claim 1; wherein in said catalyst material $M^1$ and $M^2$ represent Ni and Fe respectively.

16. A method for the generation of electrical power by using a fuel cell according to claim 13.

17. A CO tolerant low temperature fuel cell anode catalyst material having a surface, comprising:

a composition $M_x/Pt_y/Sub$;

wherein M is selected from the group consisting of elements Fe, Co, Rh and Ir; or M represents $M^1_m+M^2_n$;

$M^1$ and $M^2$ are different from each other, and are selected from the group of elements consisting of Fe, Co, Rh, Ir, Ni, Pd, Cu, Ag, Au and Sn;

Sub represents a substrate metal selected from the group consisting of Ru and Os which is present as an alloying metal in the surface anode material in an amount of less than 25% along with alloying metals M and Pt;

x is a number in the range of 0.7 to 1.3;

y is a number in the range of 0.7 to 2.3;

m and n are each a number in the range of 0.7 to 2.3; and x, y, m and n signify the relative occurrence of the different elements at the surface, not including the substrate metal.

18. An anode for a fuel cell, comprising:

a Ru or Os metal substrate having a surface modified as a CO tolerant, low temperature fuel cell anode surface alloy catalyst in which the Ru or Os (Sub) metal forms an alloy composition with Pt and modifying element M and has the formula: $M_x/Pt_y/Sub$ wherein M is selected from the group consisting of elements Fe, Co, Rh and Ir; or M represents $M^1_m+M^2_n$; wherein $M^1$ and $M^2$ are different from each other, and are selected from the group of elements consisting of Fe, Co, Rh, Ir, Ni, Pd, Cu, Ag, Au and Sn;

the Sub metal is present in the surface alloy catalyst in an amount of less than 25%;

x is a number in the range of 0.7 to 1.3;

y is a number in the range of 0.7 to 2.3;

m and n are each a number in the range of 0.7 to 2.3; and x, y, m and n signify the relative occurrence of the different elements at the surface, not including the substrate metal.

19. A method for the generation of electrical power, comprising:

operating a fuel cell whose anode is the anode catalyst material of claim 1 in which hydrogen fuel is oxidized at the anode catalyst thereby generating electrical power.

* * * * *